July 26, 1960 G. W. ARMSTRONG 2,946,132
GRAIN DRIER AND VALVE THEREFOR
Filed Oct. 14, 1957 2 Sheets-Sheet 1
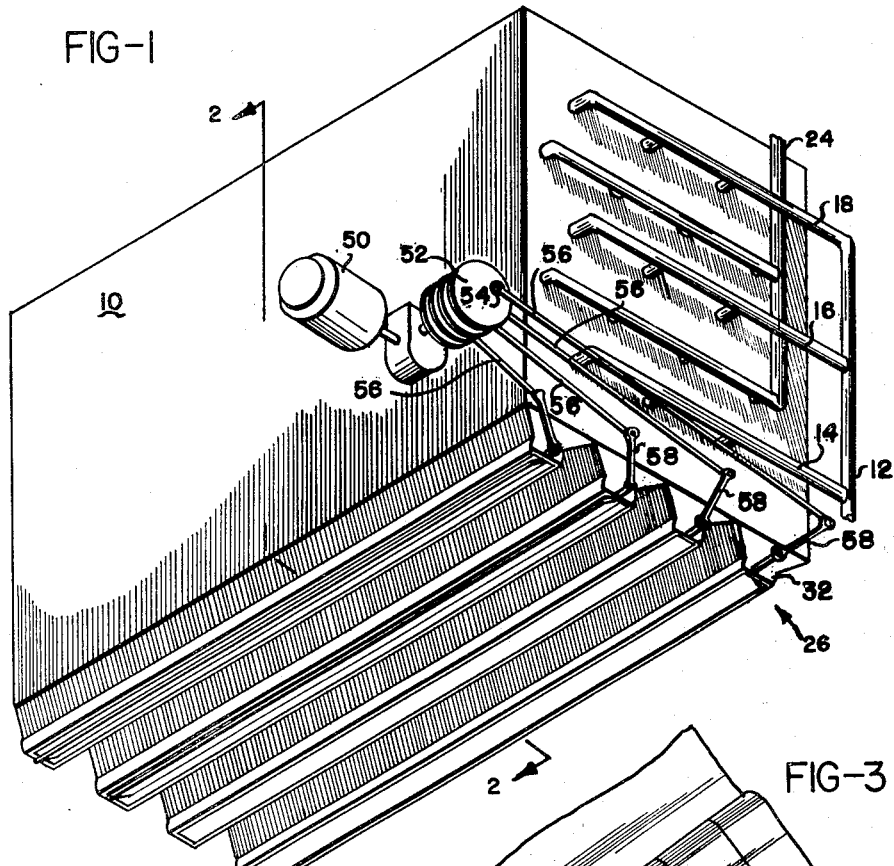
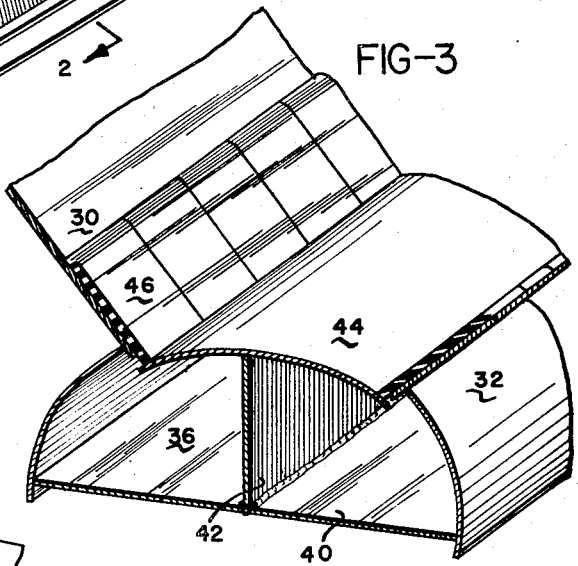
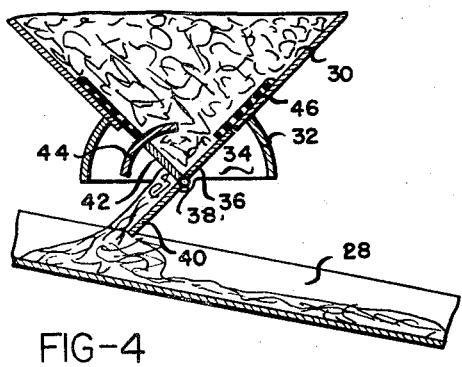
INVENTOR.
GEORGE W. ARMSTRONG
ATTORNEYS July 26, 1960 G. W. ARMSTRONG 2,946,132
GRAIN DRIER AND VALVE THEREFOR
Filed Oct. 14, 1957 2 Sheets-Sheet 2
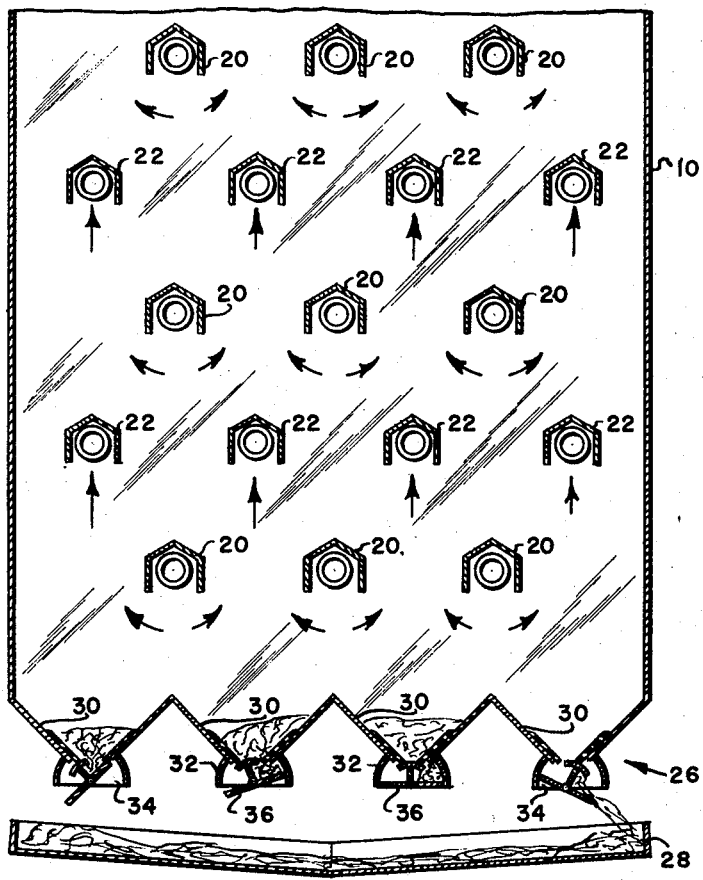
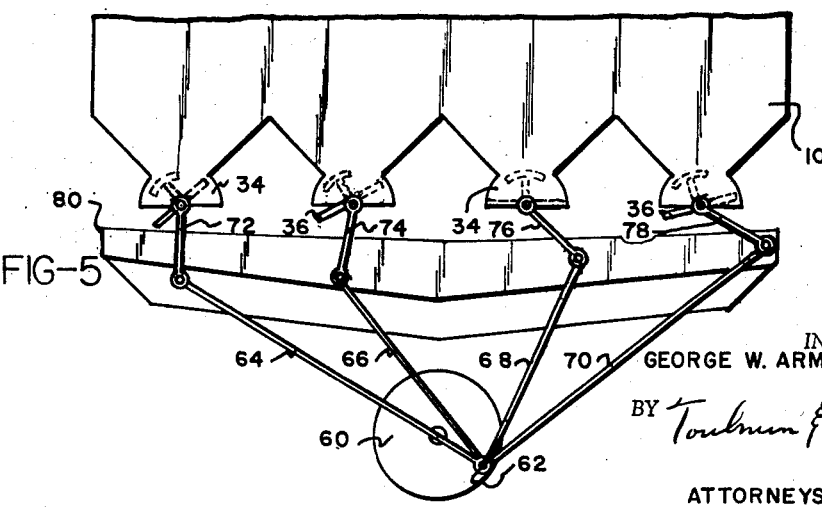
INVENTOR.
GEORGE W. ARMSTRONG
BY
ATTORNEYS

United States Patent Office 2,946,132
Patented July 26, 1960

2,946,132

GRAIN DRIER AND VALVE THEREFOR

George W. Armstrong, Fairborn, Ohio, assignor to O. B. Armstrong and Sons Company, Fairborn, Ohio, a corporation of Ohio Filed Oct. 14, 1957, Ser. No. 689,884

8 Claims. (Cl. 34—170)

This invention relates to grain driers and to valves and valve operators therefor, and to methods of operation of grain driers and valves associated therewith.

In the handling of grains in grain driers wherein the grain moves downwardly through the drier, it has always been more or less of a problem to control the flow of the grain to obtain uniform movement thereof through the drier thereby to obtain uniform drying results. Further, automatic operation of the drier valves has heretofore not been successfully accomplished so that manual operation of such a drier is common.

Still further, since a grain drier will contain a large quantity of grain, it becomes important to prevent accidental discharge of grain from the drier, such as might occur with an automatic power operated open-or-shut valve that accidentally became halted in the open position as, for example, through a power failure to the operator thereof.

Having the foregoing in mind, it is a primary object of the present invention to provide a valve arrangement and a valve operator, particularly for control of grain and the like, which will eliminate the difficulties referred to above.

A particular object of this invention is the provision of a valve for a grain drier, or the like, which will discharge only a predetermined amount of grain each time the valve is shifted, and which will prevent the free flow of grain through the valve in any stopped position thereof.

A still further object of the present invention is the provision of a power operator for a valve of the general nature of a grain drier valve in which all possibility of hazardous sparking is eliminated.

Another particular object of the present invention is the provision of a control arrangement for controlling the operation of a plurality of discharge valves associated with a body of grain, such as might be contained within a grain drier, and which control system provides for sequential operation of the valves, thereby permitting a relatively constant rate of discharge of grain from the drier so that the discharge chutes or the like leading therefrom do not become overloaded.

A still further object of the present invention is the provision of a grain drier of improved construction that accomplishes the uniform drying of the grain passing therethrough.

These and other objects and advantages of this invention will become more apparent upon reference to the following specification taken in connection with the accompanying drawings, wherein:

Figure 1 is a perspective view, more or less diagrammatic, of a grain drier adapted for having my invention incorporated therewith;

Figure 2 is a vertical sectional view indicated by line 2—2 on Figure 1 showing the grain drier in transverse cross section;

Figure 3 is a perspective view showing a discharge valve for the grain drier according to the present invention in a centered position;

Figure 4 is a sectional view showing the valve of Figure 3 in one of its tilted positons; and Figure 5 is an elevational view, showing a modified form of an actuating mechanism adapted for turning the valves of the drier sequentially.

Referring to the drawings somewhat more in detail, Figures 1 and 2 show a grain drier which consists of a hopper 10 in which grain to be dried is introduced from the top. The grain is dried by passing air therethrough, which air may be heated or dried, or pre-treated in any other desired manner in order to make it suitable for the purpose of drying the grain within the hopper 10.

This air is introduced into the grain drier via conduit 12 which has branches 14, 16 and 18 leading to a plurality of inlets in the one end wall of the hopper. Each of these inlets communicates with a horizontal, elongated, inverted trough-like arrangement 20 within hopper 10, which provides the means for discharging the air throughout the length and breadth of the hopper 10.

The grain cannot get into the inverted troughs and the troughs thus represent a simple expedient for getting air distributed throughout the grain in the drier. The troughs also serve to brace the end walls of the drier and also cause the grain to shift about so it is uniformly treated by the air entering the drier.

The air which leaves the troughs 20 passes outwardly and upwardly through the grain in the hopper, and then enters another plurality of inverted horizontal troughs 22 which communicate with a plurality of outlets in the end of hopper 10 which outlets, in turn, communicate with a discharge conduit 24 leading to exhaust.

It will be apparent that the grain in hopper 10 can be dried to any desired degree by passing air therethrough in the manner described, and that the drying air will be uniformly distributed through the drier whereby the grain will be dried uniformly.

According to the present invention, the bottom of hopper 10 is provided with a plurality of parallel arranged elongated valve structures generally indicated at 26, and which are operable to permit discharge of grain from the hopper into a discharge chute 28, which will convey the grain to a storage bin or to another point where further operations are to be performed on the grain, such as grinding.

The valves 26 are better seen in Figures 3 and 4, and are characterized in that only a predetermined amount of grain can be discharged from each thereof on each operation; and, further characterized in that there is no continuous path for the travel of grain through the valve in any position thereof, thus absolutely preventing the free-running of grain through any of the discharge valves in whatever position the said valves come to rest in the event of a power failure or the like.

Each valve comprises the tapering inlet portion 30 to which is connected the cylindrical outlet portion 32. Each valve is provided with end wall portions 34 that may be continuations of the end walls of the hopper to which the valves are attached.

Pivotally supported on the end walls 34 on an axis of rotation that corresponds with the axis of cylindrical portion 32 is a valve member 36 which may consist of a supporting shaft 38 by means of which the valve member is rotated, a flat plate portion 40 connected with shaft 38 and extending substantially diametrically across cylindrical portion 32 and an upstanding center part 42 intersecting plate 36 in the center and normal thereto, and having an arcuate top 44 which is shaped so as to be concentric with cylindrical portion 32.

The curved top 44 of the upstanding center portion of the valve member is spaced inwardly from the cylindrical part 32 of the valve housing, and there are resilient rubber-like block members 46 attached to the tapering entrance portion 30 of the valve housing on the inside thereof, and extending into position to effect sealing engagement with curved part 44 as the valve member rotates.

Reference to Figure 4 will reveal that when the valve member is tilted to its extreme counterclockwise position, the compartment to the left of the center partition member 42 discharges into chute 28, while the compartment on the other side of the partition member fills with grain from the hopper.

When the valve member is tilted into its extreme clockwise position, the opposite set of circumstances takes place, and the compartment on the right side of the partition member empties into the discharge chute, while the compartment on the left side of the partition member fills from the hopper.

It will be apparent that on each tilting movement of the valve member one compartment will empty and the other thereof will fill, but at no time is there a path for the free flow of grain completely through the valve.

It will also be apparent that any obstructions of a normal size, such as corn cobs or the like, which might get into the hopper will not prevent the valve member from moving because of the provision of the clearance between curved part 44 and cylindrical part 32 and the resilient rubber-like members 46.

The clearance is large enough to permit the corn cobs to pass therethrough, and the resilient members will be deflected by the corn cobs so that the valve will not become inoperative for this reason.

Due to the considerable quantity of grain that is discharged by each valve on every operation thereof, a control system is provided that will effect the sequential operation of the valves, whereby the discharge chute will not at any time become overloaded with grain.

According to the present invention, operating means is provided for operating the valves sequentially so that they will discharge one after the other to the discharge chute whereby a substantially continuous supply of grain to the discharge chute is had.

This also promotes uniform flow of grain through the drier and improves the drying efficiency of the mechanism.

For operating the valves sequentially, there is provided a motor 50 having attached to its output shaft a crankshaft arrangement 52 comprising a plurality of spaced plates with a plurality of throws or crank pins 54 extending therebetween and distributed thereabout in predetermined angular relation. The crank pins 54 have links 56 connected therewith leading to levers 58 mounted on the actuating shafts of the drier valves.

The angular spacing of the crank pins 54 and the location of the arms 58 is such that the valves of the drier tilt back and forth between their extreme positions as the motor operates and discharge sequentially into the discharge chute. The valves as illustrated have a maximum movement of 90 degrees consisting of 45 degrees of movement on either side of center; and, I have found that by mounting the valves spaced about 22½ degrees apart as they tilt, their discharge therefrom is sequential, and at a more or less uniform rate, whereby the discharge chute does not become overloaded as is in the case where a single valve at the bottom of the drier is availed of for dumping large charges at intervals or where a plurality of distributed valves are operated in unison.

It will be evident that the exact position of the crank pins and the length of the links and the position of the actuating arms 58 would be determined by the relative position of the motor and the drier valves, but that in every case there could be points selected for the crank pins and the crank arms so that the valves were held in the spaced relationship referred to at all times thereby obtaining the beneficial effects of sequential emptying of the valves.

Figure 5 shows a simplified modification of the actuating mechanism wherein a rotary member 60 carries a single crank pin 62 from which extends the links 64, 66, 68 and 70 to the ends of the levers 72, 74, 76 and 78, respectively. The location and length of the lever is such that the valves empty out sequentially and thus prevent overloading of the trough 80 and promote uniform movement of the grain through the drier.

From the foregoing, it will be seen that I have provided a novel grain drier structure adapted for improving the drying of the grain by making more uniform the flow of grain through the grain drier, and with an improved valve structure and operating mechanism and control means also being provided.

It will be understood that this invention is susceptible to modification in order to adapt it to different usages and conditions, and, accordingly, it is desired to comprehend such modifications within this invention as may fall within the scope of the appended claims.

I claim:

1. In a grain valve or the like; an inwardly tapering inlet portion, a cylindrical discharge portion connected to the inlet portion, a plate pivoted on the axis of said cylindrical portion, and being of about the same length as the diameter of said cylinder portion, a member upstanding at right angles from the plate in about the center thereof, an arcuate head on the end of said member concentric with said cylindrical portion but spaced therefrom, and a resilient sealing means carried by said inlet portion and engaging said arcuate head.

2. In a grain discharge valve; an inlet portion comprising two walls tapering inwardly, a discharge portion comprising cylindrical wall portions connecting with said inlet portion at the bottom, a plate pivoted on the axis of said cylindrical portion and of about the same length as the diameter of said cylindrical portion, a partition fixed to said plate in the middle thereof and extending at right angles thereto upwardly into said cylindrical portion, an arcuate head on the upper end of said partition spaced inwardly from said cylindrical portion a substantial distance, and resilient sealing means carried by the ends of the walls forming the inlet portion adapted for engaging said arcuate head so that in one tilted position the compartment on one side of the partition will fill from the hopper while the compartment on the other side of the partition is discharging, while in its other tilted position the said other compartment fills from the hopper while the said one compartment is discharging.

3. In a discharge valve for flowable materials; a downwardly opening semi-cylindrical discharge portion having an axial inlet opening along the top, a plate pivoted on the axis of said discharge portion of the same width as the diameter of said portion, a partition member upstanding from the center of said plate shorter than the radius of said discharge portion, an arcuate head on the outer end of the partition member concentric with said discharge portion, and resilient seal elements carried by the edges of said axial opening and engaging said arcuate head.

4. In a discharge valve for flowable materials; a downwardly opening semi-cylindrical discharge portion having an axial inlet opening along the top, a plate pivoted on the axis of said discharge portion of the same width as the diameter of said portion, a partition member upstanding from the center of said plate shorter than the radius of said discharge portion, an arcuate head on the outer end of the partition member concentric with said discharge portion, and resilient seal elements carried by the edges of said axial opening and engaging said arcuate head, said plate being tiltable from a center position where it closes the said discharge portion into either of two positions where the side edges of the plate substantially register with the adjacent edges of the said inlet opening.

5. In a discharge valve for flowable materials; a downwardly opening semi-cylindrical discharge portion having an axial inlet opening along the top, a plate pivoted on the axis of said discharge portion of the same width as the diameter of said portion, a partition member upstanding from the center of said plate shorter than the radius of said discharge portion, an arcuate head on the outer end of the partition member concentric with said discharge portion, and resilient seal elements carried by the edges of said axial opening and engaging said arcuate head, said plate being tiltable from a center position where it closes the said discharge portion into either of two positions where the side edges of the plate substantially register with the adjacent edges of the said inlet opening, and said arcuate head being of such circumferential extent as to be engaged by both said seal elements when the plate is in its center position, but by only one thereof whenever the plate is tilted.

6. In a grain drier; a hopper, a plurality of inverted troughs extending horizontally through said hopper and distributed substantially uniformly therein, spaced ones of said troughs being connected with a supply of drying air and others of said troughs being connected to discharge, whereby drying air can be passed through the grain in a hopper, a plurality of valves distributed across the bottom of the hopper, each valve extending substantially the length of the hopper, each valve being reciprocable between two extreme limits of travel for discharging measured amounts of grain from the drier and preventing flow of grain from the drier except when so reciprocated, and means for actuating said valves sequentially, said means comprising a rotatable crank and a plurality of links actuatable by said crank in reciprocating movements, said links being connected with said valves and arranged for holding the valves in respectively different positions between the said extreme limits of travel thereof to provide for sequential discharging of grain from the valves.

7. In a grain drier; a hopper, a plurality of inverted troughs extending horizontally through said hopper and distributed substantially uniformly therein, spaced ones of said troughs being connected with a supply of drying air into others of said troughs being connected to discharge, whereby drying air can be passed through the grain in a hopper, a plurality of valves distributed across the bottom of the hopper, each valve extending substantially the length of the hopper, each valve being reciprocable between two extreme limits of travel for discharging measured amounts of grain from the drier and preventing flow of grain from the drier except when so reciprocated, and means for actuating said valves sequentially, said means comprising a rotary crankshaft, a plurality of connecting rods connected to said crankshaft to be reciprocated thereby in timed relation, and crank arms on the valves connected to the rods and so connected with the valves that the valves are held in angular spaced relation to each other whereby the rotation of said shaft will cause sequential actuation of said valves.

8. In a grain drier; a hopper, a plurality of elongated valves extending along the full length of the bottom of said hopper in parallel spaced relation for releasing grain therefrom, said valves having bodies attached to and communicating with the hopper and having discharge openings, compartmented valve members in the bodies tiltable between opposite extreme positions for registration of the compartments alternately with the hopper and with said discharge openings for effecting the discharge of measured amounts of grain from the hopper in each said tilted position, said valve members comprising means preventing any passage of grain directly from the hopper to the discharge opening and means mechanically interconnecting said valve members for operation in continuous tilting movements while holding the valve members in fixed angularly spaced relation to each other whereby the valves discharge sequentially and the discharge of grain from the hopper is distributed uniformly across the width of the hopper.

References Cited in the file of this patent

UNITED STATES PATENTS

| 199,118 | Stillman | Jan. 8, 1878 |
| 278,356 | Niese | May 29, 1883 |
| 1,384,047 | Carter | July 12, 1921 |
| 1,685,338 | Randolph | Sept. 25, 1928 |
| 2,776,786 | Pankratz | Jan. 8, 1957 |

FOREIGN PATENTS

| 608,825 | Germany | Jan. 17, 1935 |
| 50,764 | France | Mar. 26, 1941 |